(12) United States Patent
Green

(10) Patent No.: US 7,621,032 B2
(45) Date of Patent: Nov. 24, 2009

(54) METHOD AND APPARATUS FOR CONTROLLING THE RATE OF PRESSURE APPLIED TO AN AIR CONTROLLED DEVICE

(75) Inventor: Paul H. Green, Spring, TX (US)

(73) Assignee: Smith International, Inc., Houston, TX (US)

( * ) Notice: Subject to any disclaimer, the term of this patent is extended or adjusted under 35 U.S.C. 154(b) by 919 days.

(21) Appl. No.: 10/954,093

(22) Filed: Sep. 29, 2004

(65) Prior Publication Data

US 2005/0067173 A1    Mar. 31, 2005

(51) Int. Cl.
*B23Q 17/00* (2006.01)
*B23Q 5/00* (2006.01)

(52) U.S. Cl. .................... 29/407.2; 173/176
(58) Field of Classification Search ......... 29/407.02, 29/407.08, 706, 707, 709, 714; 173/176; 91/59

See application file for complete search history.

(56) References Cited

U.S. PATENT DOCUMENTS 6,305,471 B1    10/2001    Milloy et al.

OTHER PUBLICATIONS

Official Action for Canadian Application 2,483,396 dated Oct. 30, 2007 (4pages).
Norgren; "P64F Soft Start Valve Installation & Maintenance Instructions" IM-240.610 (Oct. 2000) (1 page).

*Primary Examiner*—John C Hong
(74) *Attorney, Agent, or Firm*—Osha Liang LLP

(57) ABSTRACT

A method and an apparatus for controlling the rate of pressure applied to an air controlled device. The apparatus includes a flow restrictor, a regulator, and a dome loaded regulator. The regulator is configured to be operatively connected to a pressure source and is set to a first selected pressure. The flow restrictor is arranged to control the rate of applying pressure to the air controlled device after the first pressure is reached. The dome loaded regulator is in communication with the regulator and the flow restrictor such that the regulator and the flow restrictor alternately determine the flow rate from the pressure source to the air controlled device. The method includes setting a predetermined parameter and automatically reducing the rate of applying pressure to the air controlled device after the predetermined parameter is reached.

9 Claims, 3 Drawing Sheets

METHOD AND APPARATUS FOR CONTROLLING THE RATE OF PRESSURE APPLIED TO AN AIR CONTROLLED DEVICE

BACKGROUND OF INVENTION

Background Art

Compressed air is commonly used to actuate equipment and provide force for various functions. One function common to the oil field is to control the engagement of a cathead clutch. A cathead is a power driven rotating drum used to wind and unwind cable (e.g. braided wire or chain) on a drilling rig. The cable used with the cathead is commonly referred to as the "catline." The catline that is wound around the drum can be used for various functions on the drilling rig, such as moving heavy objects and applying torque to a threaded connection.

A simplified representation of making up a connection using a cathead is shown in FIG. 1. To apply torque, tongs 103, 104 are typically attached to the two tubular pieces 101, 102 to be connected. One tubular piece 101 is held fixed by connecting the tong 104 to a fixed object 108 using a cable 105, while the other tong 103 is connected to the catline 107 wrapped around the drum on the cathead 106. Air pressure from a pressure source (not shown) is used to actuate a cathead clutch (not shown) to turn the cathead 106, which pulls on the catline 107. The tension in the catline 107 multiplied by the distance from the center of the tubular piece 102 to the attachment point 103a ("tong length") on the tong 103 is the torque applied to the connection. The cathead 106 used to make-up connections is commonly referred to as the "make-up cathead," while a cathead used for disconnecting tubular pieces 101, 102 is commonly referred to as the "breakout cathead." Typically, a drilling rig will have both a make-up cathead 106 and a breakout cathead (not shown) located on opposite sides of the draw works 110.

To measure the amount of torque applied to a connection, an instrument (e.g. load cell) for measuring the tension in the catline may be used. In some cases, the tension is displayed on a gauge and the user multiplies the tong length to estimate the torque on the connection. A more common practice is to measure the linear strain in the catline and view an indicating meter calibrated to display units of torque (e.g. ft*lbs). Indicating meters for use on drilling rigs are usually designed such that they are not significantly affected by vibration and changes in temperature.

After the desired amount of torque has been achieved, the operator of the cathead will release the air pressure. Alternatively, the operator may use a system that automatically shuts off the air supply and vents to disengage the cathead clutch when the desired torque is reached. One such torque control system is Smith Services (Houston, Tex.) Model 2000 Tru-Torque Automatic Torque-Controlled System.

A common problem experienced with systems controlled by air pressure is that the rate of applying the pressure is difficult to control. In the scenario of using a air pressure to actuate a cathead clutch, an operator commonly controls the air flow with a throttle like control. The operator will commonly have to rely on "touch" and experience to control the rate of applying pressure. When pressure is applied too quickly, time delays in the actuation of the torque control system may cause the connection to be damaged by too much torque. With cathead clutches (and other clutches), heavy use can overheat the clutch causing slippage and inconsistent rates of applying torque. Consistent application of torque while preventing too much torque from being applied is useful for making up connections dependably and quickly.

What is needed is a system for controlling the rate of pressure applied from a pressure source to an air controlled device.

SUMMARY OF INVENTION

In one aspect, the present invention relates to an apparatus for controlling the rate of applying pressure to an air controlled device. The apparatus includes a regulator, a flow restrictor, and a dome loaded regulator. The regulator is configured to be operatively connected to a pressure source and is set to a first selected pressure. The flow restrictor is arranged to control the rate of applying pressure to the air controlled device after the first pressure is reached. The dome loaded regulator is in communication with the regulator and the flow restrictor such that the regulator and the flow restrictor alternately determine the flow rate from the pressure source to the air controlled device.

In another aspect, the present invention relates to an apparatus for controlling a rate of applying pressure to an air controlled device. The apparatus includes a pressure inlet in communication with a pressure source, a means for setting a first predetermined pressure, a means for controlling the rate of applying pressure after the first predetermined pressure is reached, and a pressure outlet in communication with the air controlled device. The rate of applying pressure after reaching the first predetermined pressure is lower than an initial rate of applying pressure.

In another aspect, the present invention relates to a method of controlling a rate of applying pressure to an air controlled device. The method includes setting a predetermined parameter and automatically reducing the rate of applying pressure to the air controlled device after the predetermined parameter is reached.

In another aspect, the present invention relates to a method of making up a connection. The method includes engaging a first tong with a first tubular piece and a second tong with a second tubular piece. Both tubular pieces have threaded connections formed thereon and are adapted to connect to each other. A catline is connected to the second tong and attached to a cathead. To apply torque to the second tubular piece using the second tong, a cathead clutch is engaged to apply a pull on the catline at a first rate. Then, pull at a second rate is automatically applied on the catline. The second rate is slower than the first rate.

Other aspects and advantages of the invention will be apparent from the following description and the appended claims.

DETAILED DESCRIPTION

In one aspect, the present invention provides an apparatus for applying pressure from a pressure source to an air controlled device. More specifically, embodiments of the present invention initially apply a relatively high rate of pressure until reaching a desired pressure, and then apply pressure at a reduced rate. In another aspect, embodiments of the present invention provide methods for applying pressure to an air controlled device.

As discussed above, rapidly applying torque to a connection has the risk of damaging a connection in the time that lapses from reaching the desired torque to the automatic or manual release of the pressure. Choking off the line providing pressure would reduce this risk, but at the same time greatly increases the amount of time spent making up connections. Further, the initial application of pressure locks the tongs in place by loading them. Slowly applying pressure before locking the tongs could cause the tongs to slip out of place, or could require personnel to hold the tongs in place during initial loading, which decreases safety.

A method in accordance with an embodiment of the invention is to initially apply pressure rapidly to the air controlled device up to a selected amount of pressure below the maximum expected for applying torque to the connection or for controlling another air controlled device. After reaching that selected pressure, the rate of applying pressure could be automatically decreased such that increases in torque are gradual towards the end of the operation.

Figure 2:
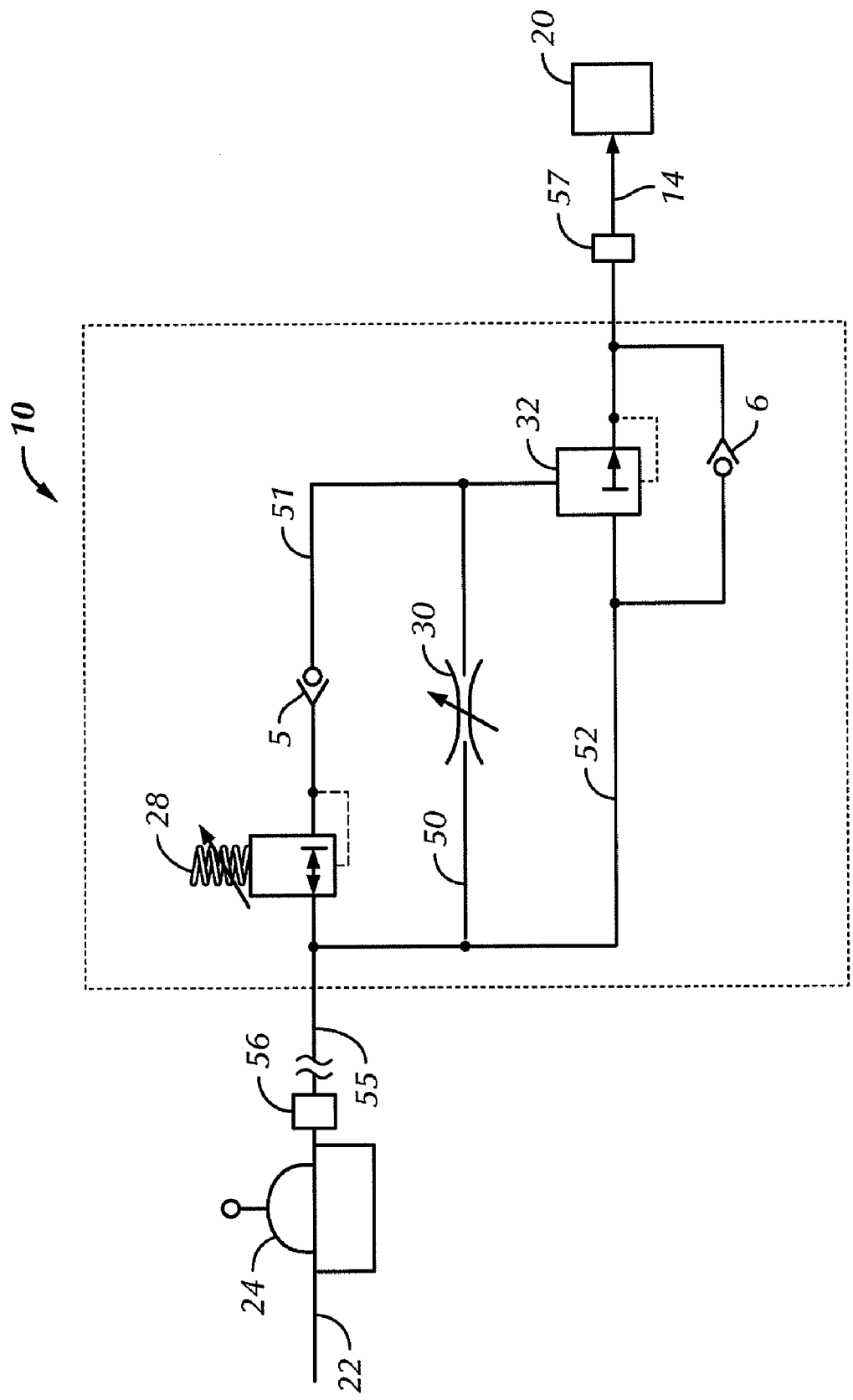
FIG. 2 shows a schematic layout of an apparatus for controlling a rate of applying pressure to an air controlled device in accordance with an embodiment of the present invention.

In FIG. 2, a schematic layout of an apparatus for controlling the rate of applying pressure to an air controlled device in accordance with one embodiment of the present invention is shown. In FIG. 2, the apparatus 10 has an inlet 56 in communication with a pressure supply 22. In this particular embodiment, a proportional control 24 is included for an operator to exercise some manual control over the rate of applying pressure. When the proportional control 24 is activated to allow pressurized air from the pressure supply 22 to flow, the pressurized air flows through line 55 into the apparatus 10. The pressurized air flow exits the apparatus 10 through line 14 and outlet 57 to control the air controlled device 20. In other embodiments, the apparatus may be directly connected to the supply source 22 and air controlled device 20. In another embodiment, inlet 56 and outlet 57 may have quick disconnects adapted to easily connect to other devices with which the apparatus 10 will operate.

In this embodiment, the apparatus 10 includes a regulator 28, a flow restrictor 30, a dome loaded regulator 32, and one way check valves 5, 6. The apparatus 10 is configured to control the rate of air supplied from the supply source 22 to the air controlled device 20 via line 52. Initially, flow through the dome loaded regulator 32 is controlled by pressure traveling through regulator 28, check valve 5, and line 51. For example, if 50 psi is applied through line 51, only 50 psi will pass through the dome loaded regulator 32. In other embodiments, the ratio may be different. For example, the dome loaded regulator 32 could be configured to allow 25 psi to pass through when 50 psi is applied to the dome loaded regulator 32 through line 51.

The regulator 28 may be set to a selected pressure to only allow flow through line 51 up to that selected pressure. Because flow is not significantly restricted prior to reaching the selected pressure, the dome loaded regulator 32 will allow a relatively high rate of supplying air to the air controlled device 20. This rapidly actuates the air controlled device 20. If the air controlled device 20 is a cathead clutch, the cathead clutch would quickly activate to tighten the catline and apply torque to the connection. After reaching the selected pressure, regulator 28 prevents applying increased pressure through line 51. At that point, the increasing pressure may flow through flow restrictor 30 and line 50 to control the dome loaded regulator 32. This decreases the rate of pressure applied to the air controlled device 20. In this embodiment, the flow restrictor 30 is shown as a needle valve that is adjustable by an operator. In another embodiment, the flow restrictor 30 may be an orifice plate. One of ordinary skill in the art will appreciate that alternative flow restrictors (both adjustable and fixed) known in the art may be used. A needle valve provides an adjustment that an operator can make to adapt the apparatus 10 to the specific situation. An orifice plate with changeable orifice sizes may be used to similarly provide an adjustment.

Continuing with FIG. 2, as air flows through the flow restrictor 30, check valve 5 prevents the air pressure from reversing through line 51. Check valve 6 is arranged to only allow flow from line 14 to pass through to line 52. Because of this, when the system is deactivated, pressurized air in the air controlled device 20 is able to release by rapidly dumping air through check valve 6 to return to the supply source 22 or vent to the atmosphere. This arrangement bypasses the flow restrictions of the dome loaded regulator 32 and flow restrictor 30.

The system may be deactivated in several ways. In one embodiment, the proportional control 24 is shut off, which vents the air to atmosphere. Pressurized air in the air controlled device 20 and apparatus 10 would rapidly vent to the atmosphere. In another embodiment designed to be used with a cathead clutch to make up connections, the apparatus 10 may be connected to a torque control device. Upon reaching a desired torque, the torque control device could actuate a valve to divert air from the cathead clutch and release it. One of ordinary skill in the art will appreciate that apparatus 10 may be adapted to work with many air controlled devices and peripherals for controlling them without departing from the scope of the invention.

Figure 3:
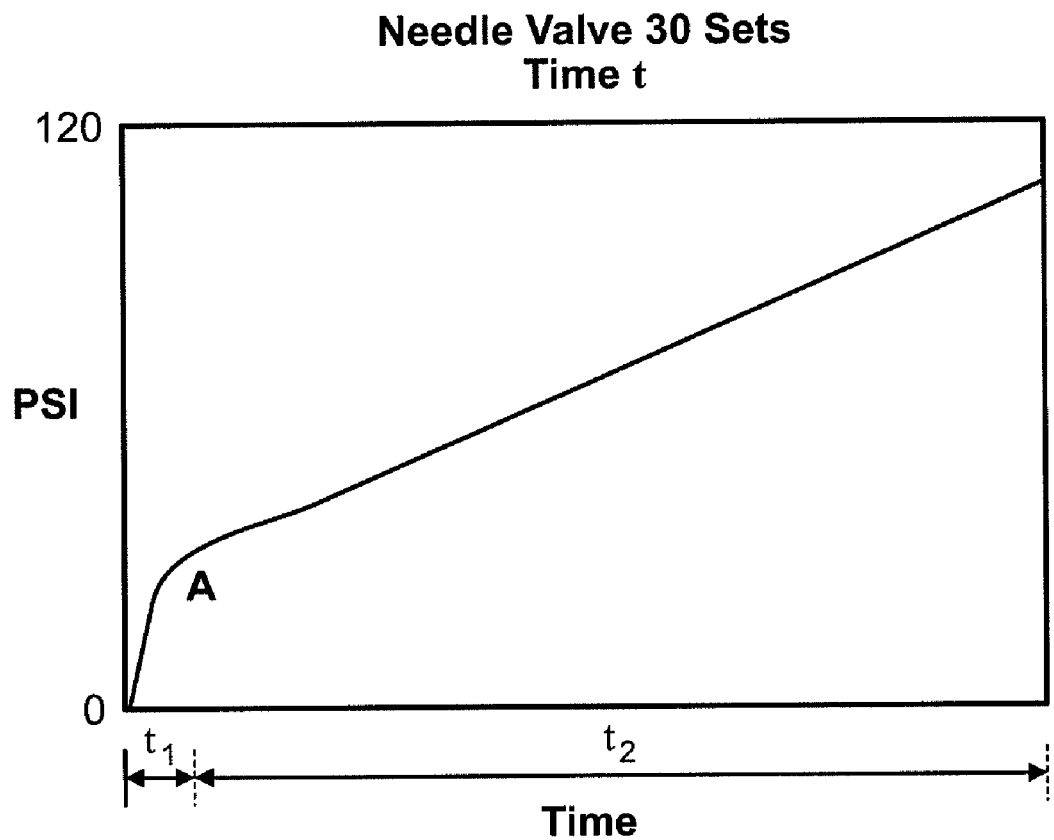
FIG. 3 shows a graph of a rate of applying pressure to an air controlled device in accordance with an embodiment of the present invention.

Turning to FIG. 3, a graph showing the rate of increasing pressure in accordance with an embodiment of the present invention is shown. FIG. 3 shows pressure plotted against time. Time T1 is the amount of time that passes prior to reaching a selected pressure A. The pressure during T1 rapidly increases. After reaching the selected pressure A, the pressure increases more gradually over the time period T2. One of ordinary skill in the art will appreciate that embodiments of the invention may be modified or adjusted to have different lengths of time periods T1, T2 and different rates of pressure increase without departing from the scope of the present invention.

Applying FIG. 3 to the apparatus 10 shown in FIG. 2, time T1 would correspond with the initial application of pressure when the air flow passes freely through regulator 28. Regulator 28 blocks air flow after the selected pressure A is reached. This causes air flow to pass through the flow restrictor 30, which reduces the flow rate (and the rate of pressure increase) as shown during time T2 in FIG. 3. In the example application of using apparatus 10 to control a cathead clutch for making up a connection, during time T1, the cathead clutch would activate rapidly to begin pulling the catline and tighten the connection. During time T2, the pressure and corresponding increase in torque applied to the connection would be more gradual. The more gradual increase in torque advantageously reduces the risk of applying too much torque prior to deactivating the cathead clutch. Further, the rapid activation of the cathead clutch during time T1 reduces the amount of time used to make up the connection.

Note that FIG. 2 is for illustration only. One of ordinary skill in the art will appreciate that various modifications of the apparatus 10 are possible to achieve the pressure profile shown in FIG. 3 without departing from the scope of the present invention. For example, the regulator 28 and flow restrictor 30 may be combined in a single mechanism such that the combing regulator/flow restrictor begins to restrict flow at a selected pressure.

In some embodiments of the invention, the rate of air flow through the flow restrictor (shown as 30 in FIG. 2) can be adjusted to control the rate of air flow after reaching the selected pressure A. In some embodiments, selected pressure A may be adjusted by the user by selecting a regulator (28 in FIG. 2) with an adjustment feature. Being able to adjust selected pressure A and/or the rate of air flow through the flow restrictor allows for an operator to adapt the apparatus to the supply source, the air controlled device to be controlled, and any additional equipment that may be connected to the apparatus. In the example application of engaging a cathead clutch for making up a connection, an embodiment of the invention with an adjustable regulator and flow restrictor could be adapted for the air pressure to be supplied from the pressure source, the torque to be applied to the connection, and to the maximum pull that the cathead can achieve. In some embodiments, adjustment to the regulator and flow restrictor may be performed by hand or with readily available hand tools such as a screw driver.

While the above embodiments have only shown a single change in the rate of applying pressure, one of ordinary skill in the art that an apparatus could be similarly designed to have two or more changes in the rate of applying pressure. This may be accomplished by adding a second regulator with a selected pressure B in line (or in parallel) with a second flow restrictor allowing a different flow rate than the other flow restrictor.

Figure 4:
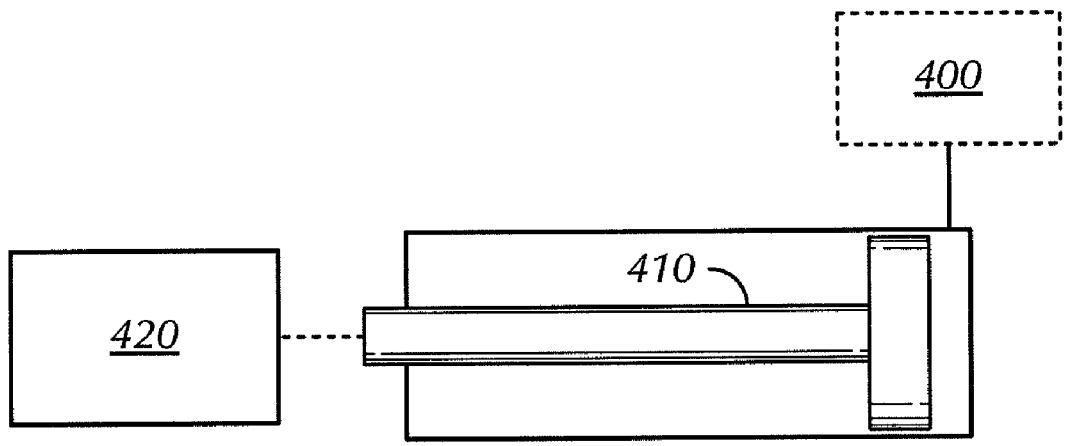
FIG. 4 shows a schematic layout of an air over hydraulics system in accordance with an embodiment of the present invention.

In one embodiment, the air controlled device 20 may be a piston 410 connected to a hydraulics system 420, as shown in FIG. 4. This arrangement is commonly referred to as an "air over hydraulics" system. The apparatus 400 may control the amount of pressure applied to the piston 410, which controls pressure in the hydraulics system 420. In one embodiment, the piston 410 may control flow through a dome loaded regulator (not shown) in the hydraulics system 420.

Figure 1:
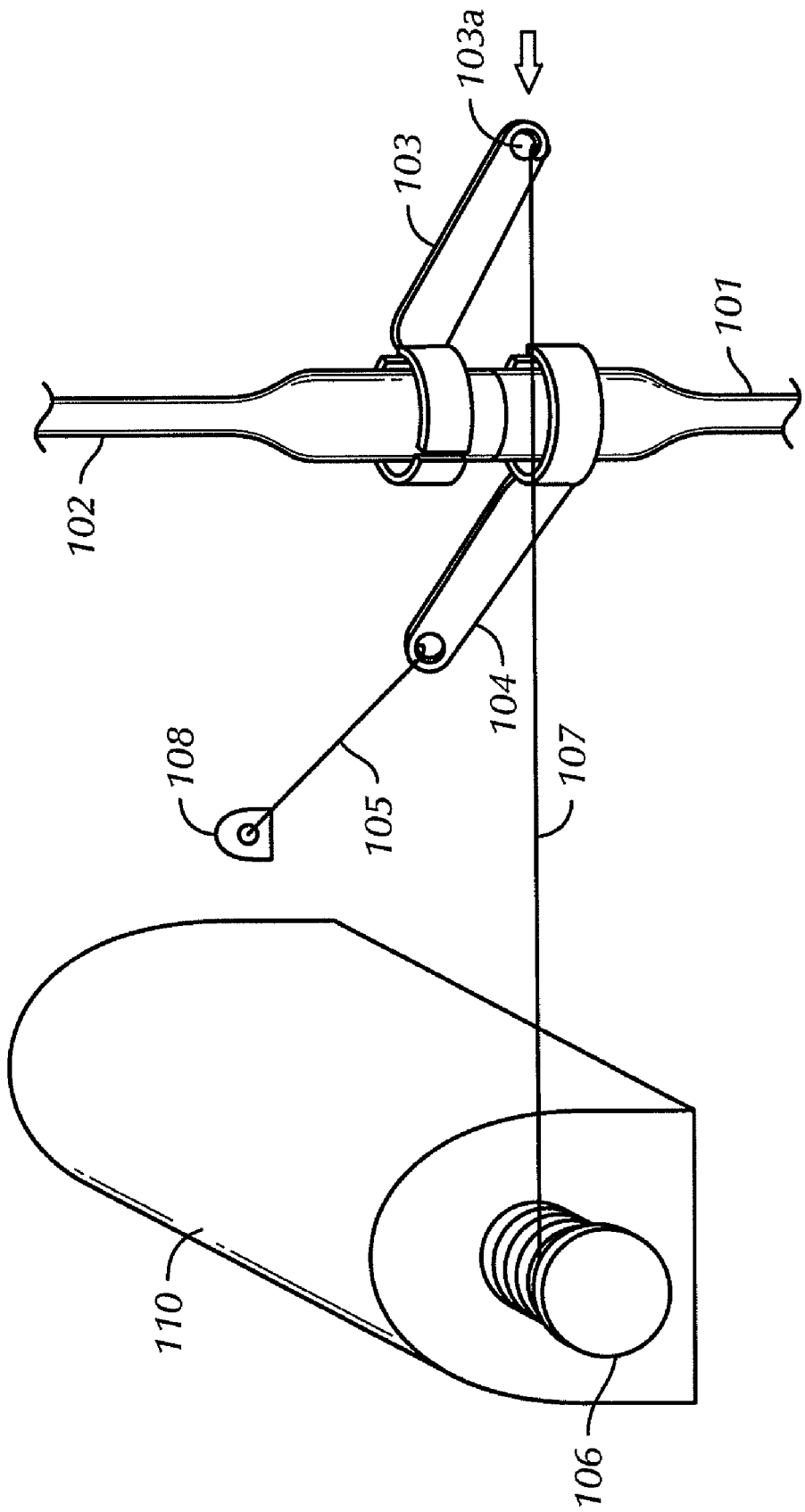
FIG. 1 shows a setup for making up a connection.

Embodiments of the invention offer one or more of the following advantages. Embodiments of the invention having only mechanically actuated components (e.g. FIG. 1) are able to be put in line with already existing equipment to provide a simple apparatus for controlling pressure. Such an embodiment does not require extra power or controls and can be adapted to plug into an already existing pressure line. Further, limiting the use of electronically actuated components is useful for harsher environments. For example, many components for use in the oilfield must be explosion proof (i.e. not provide an ignition source). Mechanically actuated components do not require extra preparation to not provide ignition sources. Embodiments of the invention that only have mechanically actuated components inherently meet this requirement. Additional electrically actuated components used in accordance with some embodiments of the invention may require modifications to meet this requirement.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for controlling a rate of applying pressure to an air controlled device, the apparatus comprising:
    a regulator configured to be operatively connected to a pressure source, wherein the regulator is set to a first selected pressure;
    a flow restrictor arranged to control the rate of applying pressure to the air controlled device after the first selected pressure is reached; and
    a dome loaded regulator in communication with the regulator and the flow restrictor to alternately receive pressure from the regulator and the flow restrictor, such that the regulator and the flow restrictor alternately determine the rate of applying pressure from the pressure source to the air controlled device.

2. The apparatus of claim 1, further comprising:
    a check valve located between the regulator and the dome loaded regulator, wherein the check valve is arranged to only allow flow from the regulator to the dome loaded regulator.

3. The apparatus of claim 1, further comprising:
    a check valve located between the air controlled device and the pressure source, wherein the check valve is arranged to only allow flow from the air controlled device to the pressure source.

4. The apparatus of claim 1, wherein at least one of the regulator and the flow restrictor is adjustable.

5. The apparatus of claim 1, wherein the flow restrictor is selected from the group consisting of a needle valve and an orifice plate.

6. The apparatus of claim 1, wherein the air controlled device is a cathead clutch.

7. The apparatus of claim 1, wherein the air controlled device is a piston connected to a hydraulics system.

8. The apparatus of claim 1, further comprising:
    a torque limiting device that automatically releases air pressure when a selected torque is applied to a connection.

9. An apparatus for controlling a rate of applying pressure to an air controlled device, the apparatus comprising:
    a pressure inlet in communication with a pressure source;
    a means for setting a first predetermined pressure and providing a first rate of applying pressure to the air controlled device before the first predetermined pressure is reached;
    a means for providing a second rate of applying pressure to the air controlled device after the first determined pressure is reached;
    a means for alternately receiving the rate of applying pressure from the two means for providing the rates of applying pressure and controlling the pressure applied to the air controlled device; and
    a pressure outlet in communication with the air controlled device.

* * * * *